US012040122B2

(12) United States Patent
Kazuta et al.

(10) Patent No.: US 12,040,122 B2
(45) Date of Patent: Jul. 16, 2024

(54) MULTILAYER COIL COMPONENT

(71) Applicant: TDK CORPORATION, Tokyo (JP)

(72) Inventors: Youichi Kazuta, Tokyo (JP); Hajime Kato, Tokyo (JP); Makoto Yoshino, Tokyo (JP); Kazuya Tobita, Tokyo (JP); Yuto Shiga, Tokyo (JP); Noriaki Hamachi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 771 days.

(21) Appl. No.: 16/391,361

(22) Filed: Apr. 23, 2019

(65) Prior Publication Data

US 2019/0333686 A1 Oct. 31, 2019

(30) Foreign Application Priority Data

Apr. 26, 2018 (JP) ................................ 2018-085415

(51) Int. Cl.
*H01F 27/28* (2006.01)
*H01F 27/29* (2006.01)

(52) U.S. Cl.
CPC ......... *H01F 27/29* (2013.01); *H01F 27/2804* (2013.01); *H01F 2027/2809* (2013.01)

(58) Field of Classification Search
CPC ......... H01F 17/0013; H01F 2027/2809; H01F 17/0006; H01F 27/2804; H01F 5/003; H01F 27/29; H01F 27/292
USPC .................................................. 336/200, 232
See application file for complete search history.

(56) References Cited

U.S. PATENT DOCUMENTS

2015/0371757 A1* 12/2015 Takezawa ............ H01F 27/292 336/200
2017/0103846 A1* 4/2017 Yoneda ................ H01F 41/122
2017/0256352 A1 9/2017 Kido
2017/0345558 A1* 11/2017 Sekiguchi .............. H01F 27/29
2018/0068780 A1 3/2018 Shimoda et al.
2018/0090266 A1 3/2018 Sano et al.
2019/0051450 A1* 2/2019 Shimoda ............ H01F 27/2852
2019/0148058 A1 5/2019 Sano et al.
(Continued)

FOREIGN PATENT DOCUMENTS

CN 104916390 A * 9/2015 ......... H01F 17/0013
CN 107808734 A 3/2018
JP 2006-324489 A 11/2006
(Continued)

OTHER PUBLICATIONS

U.S. Pub. 2019/0051450A1 cited in Nov. 29, 2021 Office Action.

*Primary Examiner* — Tszfung J Chan
(74) *Attorney, Agent, or Firm* — Oliff PLC

(57) ABSTRACT

A multilayer coil component includes an element assembly that has a first surface and second surfaces and extending in a direction orthogonal to the first surface, and terminal electrodes that has first electrode parts extending in a direction orthogonal to the first surface along the second surfaces. At least a portion of the first electrode parts of the terminal electrodes is disposed inside the element assembly. The element assembly is present between imaginary lines extending in a direction parallel to the first surface toward the second surfaces from a position farthest from the first surface in a direction orthogonal to the first surface in the first electrode parts positioned inside the element assembly and the first surface.

8 Claims, 7 Drawing Sheets

(56) References Cited

U.S. PATENT DOCUMENTS

2022/0028602 A1 1/2022 Shimoda et al.

FOREIGN PATENT DOCUMENTS

| | | | |
|---|---|---|---|
| JP | 2017-157770 | A | 9/2017 |
| JP | 2018-50015 | A | 3/2018 |
| JP | 2019-036589 | A | 3/2019 |

* cited by examiner

MULTILAYER COIL COMPONENT

TECHNICAL FIELD

The present invention relates to a multilayer coil component.

BACKGROUND

Patent Literature 1 (Japanese Unexamined Patent Publication No. 2017-157770) discloses a multilayer coil component as an example in the related art. The multilayer coil component disclosed in Patent Literature 1 includes an insulating layer that has a first side extending in a first direction and a second side extending in a second direction, and an external conductor layer that is provided at a first point where the first side and the second side intersect. In the multilayer coil component disclosed in Patent Literature 1, in the external conductor layer, a position farthest to one side in the second direction from the first point in a part farthest to one side in the first direction from the first point is defined as a second point. In the external conductor layer, a position farthest to one side in the first direction from the first point in a part farthest to one side in the second direction from the first point is defined as a third point. The external conductor layer has a fixing portion positioned within a region having a third side connecting the second point and the third point, a fourth side extending toward the other side in the first direction from the second point, and a fifth side extending toward the other side in the second direction from the third point.

SUMMARY

In multilayer coil components in the related art, a fixing portion is provided for the purpose of preventing a terminal electrode from falling (peeling) from an element assembly. However, in multilayer coil components in the related art, a fixing portion and a coil are provided to be close to each other. Therefore, in multilayer coil components in the related art, stray capacitance (parasitic capacitance) may be generated between a fixing portion and a coil. Accordingly, there is concern that characteristics of a multilayer coil component will deteriorate.

An object of an aspect of the present invention is to provide a multilayer coil component in which a terminal electrode can be prevented from peeling from an element assembly and characteristics can be prevented from deteriorating.

According to the aspect of the present invention, there is provided a multilayer coil component including an element assembly that has a first surface and a second surface extending in a direction orthogonal to the first surface, a coil that is disposed inside the element assembly, and a terminal electrode that has a first electrode part extending in a direction orthogonal to the first surface along the second surface. At least a portion of the first electrode part of the terminal electrode is disposed inside the element assembly. The element assembly is present between an imaginary line extending in a direction parallel to the first surface toward the second surface from a position farthest from the first surface in a direction orthogonal to the first surface in the first electrode part positioned inside the element assembly, and the first surface.

In the multilayer coil component according to the aspect of the present invention, the element assembly is present between the imaginary line and the first surface. Accordingly, in the multilayer coil component, even if a force acts on the terminal electrode outward from the second surface in a direction parallel to the first surface, since the element assembly is present between the first electrode part and the second surface, the element assembly curbs peeling off of the first electrode part. Thus, in the multilayer coil component, the terminal electrode can be prevented from peeling from the element assembly.

In addition, in the multilayer coil component, according to the foregoing configuration, the terminal electrode can be prevented from peeling from the element assembly. Therefore, in the multilayer coil component, there is no need to provide a fixing portion as in the related art. Thus, in the multilayer coil component, stray capacitance can be prevented from being generated with respect to the coil. Therefore, in the multilayer coil component, characteristics can be prevented from deteriorating.

In the embodiment, the terminal electrode may have a second electrode part extending in a direction orthogonal to the second surface along the first surface. In this configuration, the terminal electrode exhibits substantially an L-shape. Therefore, in the multilayer coil component, the terminal electrode can be further prevented from peeling from the element assembly.

In the embodiment, at least a portion of the second electrode part of the terminal electrode may be disposed inside the element assembly. The element assembly may be present between an imaginary line extending in a direction parallel to the second surface toward the first surface from a position farthest from the second surface in a direction orthogonal to the second surface in the second electrode part positioned inside the element assembly and the second surface. In this configuration, the element assembly is present between the imaginary line and the second surface. Accordingly, in the multilayer coil component, even if a force acts on the terminal electrode outward from the first surface in a direction parallel to the second surface, since the element assembly is present between the second electrode part and the second surface, the element assembly curbs peeling off of the second electrode part. Thus, in the multilayer coil component, the terminal electrode can be further prevented from peeling from the element assembly.

In the embodiment, the first surface of the element assembly may be a mounting surface. When a multilayer coil component is mounted on a circuit board or the like, a force applied to an element assembly due to a thermal shock tends to most significantly act on an end portion of an electrode part at a position away from the mounting surface. Accordingly, the first electrode part is likely to peel from the element assembly. Therefore, when the first surface of the element assembly is a mounting surface, a configuration in which the element assembly is present between the imaginary line and the first surface is particularly effective to prevent peeling off of the first electrode part.

In the embodiment, the first surface of the element assembly may be a mounting surface. The terminal electrode may have a second electrode part extending in a direction orthogonal to the second surface along the first surface and being disposed on the first surface. When a multilayer coil component is mounted on a circuit board or the like, a force applied to an element assembly due to a thermal shock tends to most significantly act on an end portion of an electrode part at a position away from the mounting surface. Accordingly, the first electrode part is likely to peel from the element assembly. Therefore, when the first surface of the element assembly is a mounting surface, a configuration in which the element assembly is present between the imaginary line and the first surface is particularly effective to prevent peeling off of the first electrode part.

According to the aspect of the present invention, a terminal electrode can be prevented from peeling from an element assembly and characteristics can be prevented from deteriorating.

DETAILED DESCRIPTION

Hereinafter, preferable embodiments of the present invention will be described in detail with reference to the accompanying drawings. In description of the drawings, the same reference signs are applied to elements which are the same or corresponding, and duplicated description thereof will be omitted.

Figure 1:
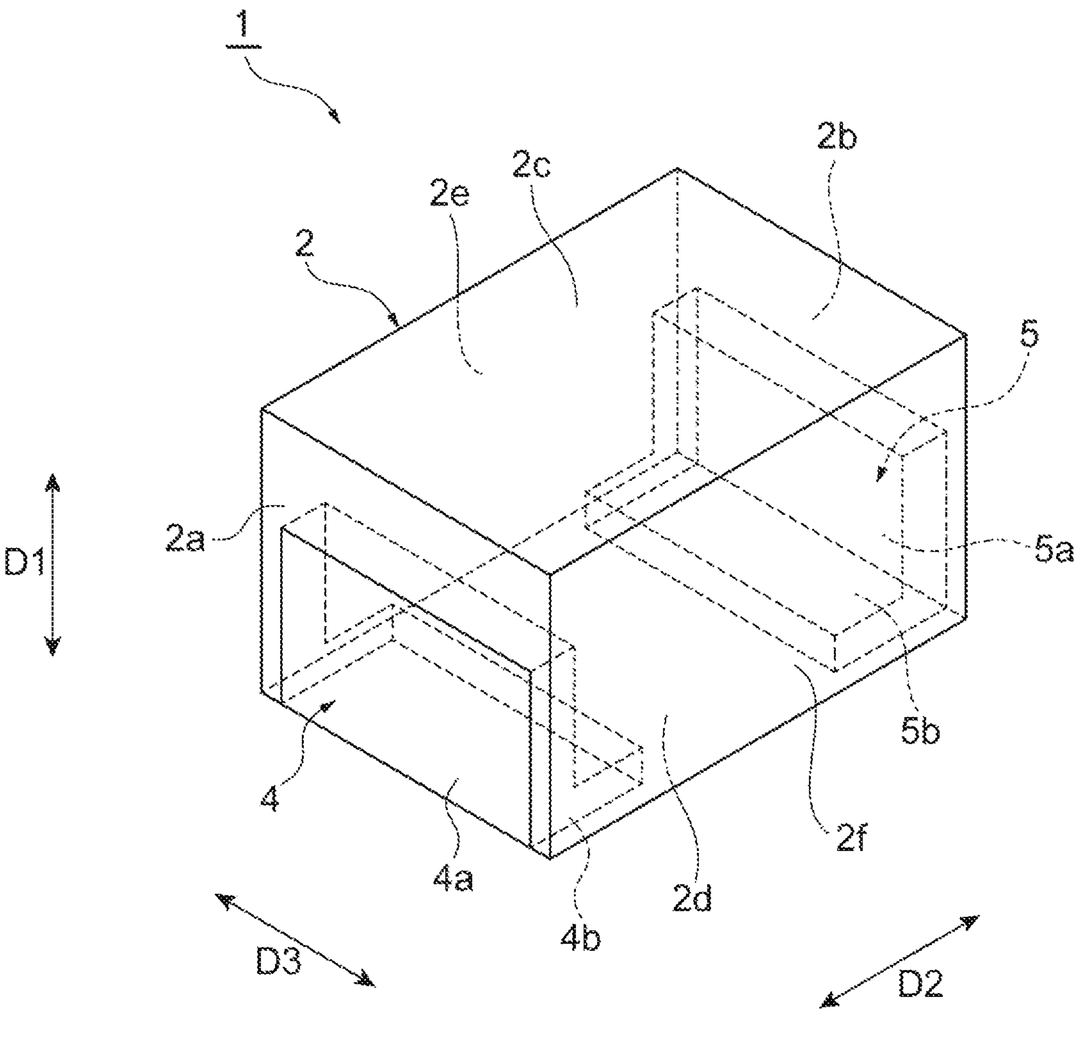
FIG. 1 is a perspective view of a multilayer coil component according to an embodiment.

As illustrated in FIG. 1, a multilayer coil component 1 includes an element assembly 2, and a first terminal electrode 4 and a second terminal electrode 5 which are respectively disposed in both end portions of the element assembly 2.

The element assembly 2 exhibits a rectangular parallelepiped shape. The rectangular parallelepiped shape includes a rectangular parallelepiped shape having chamfered corners and ridgelines, and a rectangular parallelepiped shape having rounded corners and ridgelines. As outer surfaces, the element assembly 2 has a pair of end surfaces (first surface and second surface) 2*a* and 2*b* facing each other, a pair of main surfaces (first surface and second surface) 2*c* and 2*d* facing each other, and a pair of side surfaces 2*e* and 2*f* facing each other. A facing direction in which the pair of main surfaces 2*c* and 2*d* face each other (direction parallel to the end surfaces 2*a* and 2*b*) is a first direction D1. A facing direction in which the pair of end surfaces 2*a* and 2*b* face each other (direction parallel to the main surfaces 2*c* and 2*d*) is a second direction D2. A facing direction in which the pair of side surfaces 2*e* and 2*f* face each other is a third direction D3. In the present embodiment, the first direction D1 is a height direction of the element assembly 2. The second direction D2 is a longitudinal direction of the element assembly 2 and is orthogonal to the first direction D1. The third direction D3 is a width direction of the element assembly 2 and is orthogonal to the first direction D1 and the second direction D2.

The pair of end surfaces 2*a* and 2*b* extend in the first direction D1 such that the pair of main surfaces 2*c* and 2*d* are connected to each other. The pair of end surfaces 2*a* and 2*b* extend in the third direction D3 (short side direction of the pair of main surfaces 2*c* and 2*d*) as well. The pair of side surfaces 2*e* and 2*f* extend in the first direction D1 such that the pair of main surfaces 2*c* and 2*d* are connected to each other. The pair of side surfaces 2*e* and 2*f* extend in the second direction D2 (long side direction of the pair of end surfaces 2*a* and 2*b*) as well. In the present embodiment, the main surface 2*d* is stipulated as a mounting surface facing another electronic instrument (for example, a circuit board or an electronic component) when the multilayer coil component 1 is mounted on another electronic instrument.

Figure 2:
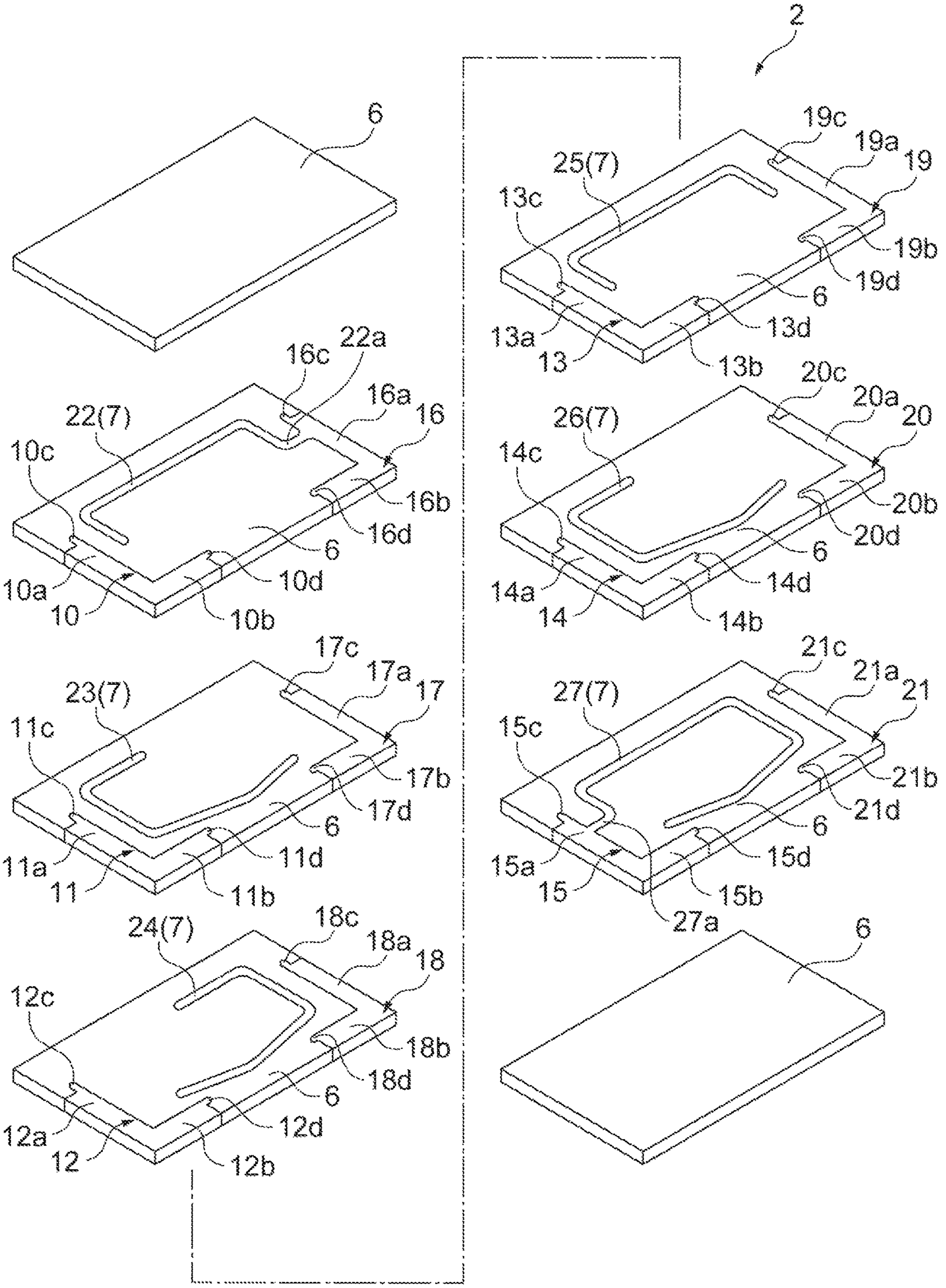
FIG. 2 is an exploded perspective view of an element assembly of the multilayer coil component.

As illustrated in FIG. 2, the element assembly 2 is configured to have a plurality of dielectric layers (insulating layers) 6 layered in a direction in which the pair of side surfaces 2*e* and 2*f* face each other. In the element assembly 2, the layered direction of the plurality of dielectric layers 6 (which will hereinafter be simply referred to as "a layered direction") coincides with the third direction D3. For example, each of the dielectric layers 6 is constituted of a sintered body of a ceramic green sheet including a dielectric material (a $BaTiO_3$-based dielectric ceramic, a $Ba(Ti, Zr)O_3$-based dielectric ceramic, a $(Ba, Ca)TiO_3$-based dielectric ceramic, or the like). In the actual element assembly 2, the dielectric layers 6 are integrated to the extent that boundaries between the dielectric layers 6 cannot be visually recognized.

The first terminal electrode 4 is disposed on the end surface 2*a* side of the element assembly 2, and the second terminal electrode 5 is disposed on the end surface 2*b* side of the element assembly 2. That is, the first terminal electrode 4 and the second terminal electrode 5 are positioned to be separated from each other in the facing direction of the pair of end surfaces 2*a* and 2*b*. The first terminal electrode 4 and the second terminal electrode 5 include a conductive material (for example, Ag or Pd). The first terminal electrode 4 and the second terminal electrode 5 are constituted as a sintered body of a conductive paste including a conductive metal powder (for example, Ag powder or Pd powder). The first terminal electrode 4 and the second terminal electrode 5 are subjected to electroplating, and a plated layer is formed on their front surfaces. For example, Ni or Sn is used for electroplating.

The first terminal electrode 4 is embedded in the element assembly 2. The first terminal electrode 4 is disposed while straddling the end surface 2*a* and the main surface 2*d*. In the present embodiment, the front surface of the first terminal electrode 4 is flush with each of the end surface 2*a* and the main surface 2*d*.

The first terminal electrode 4 exhibits an L-shape when seen in the third direction D3. The first terminal electrode 4 has a first electrode part 4*a* and a second electrode part 4*b*. The first electrode part 4*a* and the second electrode part 4*b* are connected to each other at a ridgeline of the element assembly 2 and are electrically connected to each other. The first electrode part 4*a* extends in the first direction D1. The first electrode part 4*a* exhibits a rectangular shape when seen in the second direction D2. The second electrode part 4*b* extends in the second direction D2. The second electrode part 4*b* exhibits a rectangular shape when seen in the first direction D1. The first electrode part 4*a* and the second electrode part 4*b* extend in the third direction D3.

Figure 3:
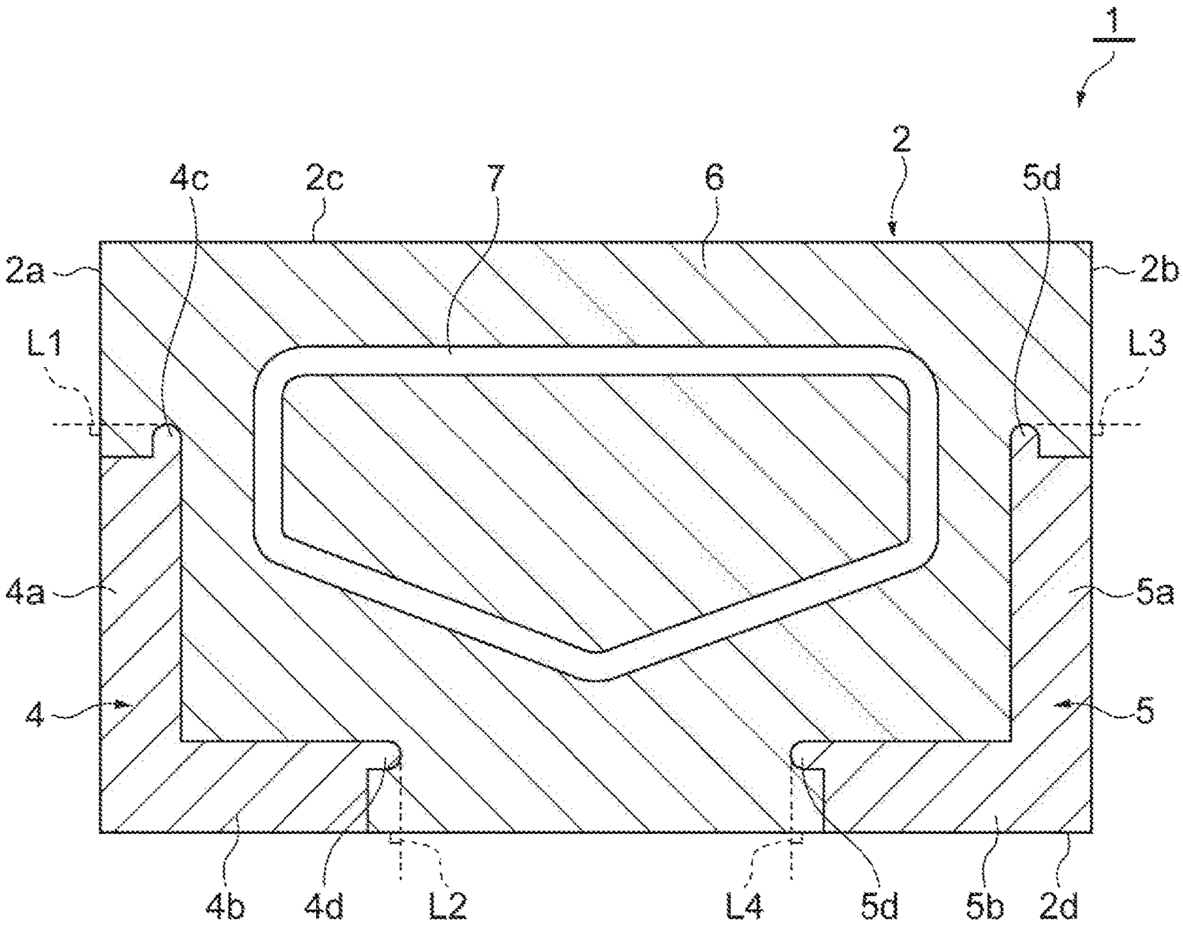
FIG. 3 is a view illustrating a cross-sectional configuration of the multilayer coil component.

As illustrated in FIG. 3, a first projection portion 4*c* is provided in the first electrode part 4*a*. The first projection portion 4*c* protrudes toward the main surface 2*c* from the end portion of the first electrode part 4*a* on the main surface 2*c* side. The first projection portion 4*c* is provided at a position on the end surface 2*b* side in the end portion of the first electrode part 4*a*, A second projection portion 4*d* is provided in the second electrode part 4*b*. The second projection portion 4*d* protrudes toward the end surface 2*b* from the end portion of the second electrode part 4*b* on the end surface 2*b* side. The second projection portion 4*d* is provided at a position on the main surface 2*c* side in the end portion of the second electrode part 4*b*. A distal end of each of the first projection portion 4*c* and the second projection portion 4*d* exhibits a curved shape.

As illustrated in FIG. 2, the first terminal electrode 4 is configured to have a plurality of electrode layers 10 to 15 in a layered manner. Each of the electrode layers 10 to 15 is provided in a recess portion of the dielectric layer 6. Each of the electrode layers 10 to 15 is formed by forming a recess portion in the dielectric layer 6 and filling the recess portion with a conductive paste and baking the conductive paste. Each of the electrode layers 10 to 15 is disposed on the dielectric layer 6. The dielectric layer 6 illustrated in FIG. 2 is configured to have dielectric layers in which the electrode layers 10 to 15 are respectively disposed and dielectric layers (pattern sheets) in which patterns corresponding to the shapes of the electrode layers 10 to 15 are respectively provided, in an overlapping manner.

The electrode layer 10 exhibits an L-shape when seen in the third direction D3. The electrode layer 10 has a first part 10*a* and a second part 10*b*. The first part 10*a* extends in the first direction D1. The second part 10*b* extends in the second direction D2. A projection portion 10*c* protruding toward the main surface 2*c* from the end portion on the main surface 2*c* side is provided in the first part 10*a*. A projection portion 10*d* protruding toward the end surface 2*b* from the end portion on the end surface 2*b* side is provided in the second part 10*b*.

The electrode layers 11 to 15 have a configuration similar to that of the electrode layer 10. The electrode layer 11 has a first part 11*a* and a second part 11*b*. A projection portion 11*c* is provided in the first part 11*a*. A projection portion 11*d* is provided in the second part 11*b*. The electrode layer 12 has a first part 12*a* and a second part 12*b*. A projection portion 12*c* is provided in the first part 12*a*. A projection portion 12*d* is provided in the second part 12*b*. The electrode layer 13 has a first part 13*a* and a second part 13*b*. A projection portion 13*c* is provided in the first part 13*a*. A projection portion 13*d* is provided in the second part 13*b*.

The electrode layer 14 has a first part 14*a* and a second part 14*b*. A projection portion 14*c* is provided in the first part 14*a*. A projection portion 14*d* is provided in the second part 14*b*. The electrode layer 15 has a first part 15*a* and a second part 15*b*. A projection portion 15*c* is provided in the first part 15*a*. A projection portion 15*d* is provided in the second part 15*b*.

The first electrode part 4*a* of the first terminal electrode 4 is configured to have the first parts 10*a* to 15*a* of the electrode layers 10 to 15 in a layered manner. The second electrode part 4*b* of the first terminal electrode 4 is configured to have the second parts 10*b* to 15*b* of the electrode layers 10 to 15 in a layered manner. The first projection portion 4*c* of the first terminal electrode 4 is configured to have the projection portions 10*c* to 15*c* of the electrode layers 10 to 15 in a layered manner. The second projection portion 4*d* of the first terminal electrode 4 is configured to have the projection portions 10*d* to 15*d* of the electrode layers 10 to 15 in a layered manner.

As illustrated in FIG. 3, the second terminal electrode 5 is embedded in the element assembly 2. The second terminal electrode 5 is disposed while straddling the end surface 2*b* and the main surface 2*d*. In the present embodiment, the front surface of the second terminal electrode 5 is flush with each of the end surface 2*b* and the main surface 2*d*.

The second terminal electrode 5 exhibits an L-shape when seen in the third direction D3. The second terminal electrode 5 has a first electrode part 5*a* and a second electrode part 5*b*. The first electrode part 5*a* and the second electrode part 5*b* are connected to each other at a ridgeline of the element assembly 2 and are electrically connected to each other. The first electrode part 5*a* extends in the first direction D1. The first electrode part 5*a* exhibits a rectangular shape when seen in the third direction D3. The second electrode part 5*b* extends in the second direction D2. The second electrode part 5*b* exhibits a rectangular shape when seen in the third direction D3. The first electrode part 5*a* and the second electrode part 5*b* extend in the third direction D3.

A first projection portion 5*c* is provided in the first electrode part 5*a*. The first projection portion 5*c* protrudes toward the main surface 2*c* from the end portion of the first electrode part 5*a* on the main surface 2*c* side. The first projection portion 5*c* is provided at a position on the end surface 2*a* side in the end portion of the first electrode part 5*a*. A second projection portion 5*d* is provided in the second electrode part 5*b*. The second projection portion 5*d* protrudes toward the end surface 2*a* from the end portion of the second electrode part 5*b* on the end surface 2*a* side. The second projection portion 5*d* is provided at a position on the main surface 2*c* side in the end portion of the second electrode part 5*b*. A distal end of each of the first projection portion 5*c* and the second projection portion 5*d* exhibits a curved shape.

As illustrated in FIG. 2, the second terminal electrode 5 is configured to have a plurality of electrode layers 16 to 21 in a layered manner. Each of the electrode layers 16 to 21 is provided in the recess portion of the dielectric layer 6. Each of the electrode layers 16 to 21 is formed by forming a recess portion in the dielectric layer 6 and filling the recess portion with a conductive paste and baking the conductive paste. The electrode layers 16 to 21 are formed by a method similar to that of the electrode layers 10 to 15. Each of the electrode layers 16 to 21 is disposed on the dielectric layer 6. The dielectric layer 6 illustrated in FIG. 2 is configured to have dielectric layers in which the electrode layers 16 to 21 are respectively disposed and dielectric layers (pattern sheets) in which patterns corresponding to the shapes of the electrode layers 16 to 21 are respectively provided, in an overlapping manner.

The electrode layer 16 exhibits an L-shape when seen in the third direction D3. The electrode layer 16 has a first part 16*a* and a second part 16*b*. The first part 16*a* extends in the first direction D1. The second part 16*b* extends in the second direction D2. A projection portion 16*c* protruding toward the main surface 2*c* from the end portion on the main surface 2*c* side is provided in the first part 16*a*. A projection portion 16*d* protruding toward the end surface 2*a* from the end portion on the end surface 2*a* side is provided in the second part 16*b*.

The electrode layers 17 to 21 have a configuration similar to that of the electrode layer 16. The electrode layer 17 has a first part 17*a* and a second part 17*b*. A projection portion 17*c* is provided in the first part 17*a*. A projection portion 17*d* is provided in the second part 17*b*. The electrode layer 18 has a first part 18*a* and a second part 18*b*. A projection portion 18*c* is provided in the first part 18*a*. A projection portion 18*d* is provided in the second part 18*b*. The electrode layer 19 has a first part 19*a* and a second part 19*b*. A projection portion 19*c* is provided in the first part 19*a*. A projection portion 19*d* is provided in the second part 19*b*.

The electrode layer 20 has a first part 20*a* and a second part 20*b*, A projection portion 20*c* is provided in the first part 20*a*. A projection portion 20*d* is provided in the second part 20*b*. The electrode layer 21 has a first part 21*a* and a second part 21*b*. A projection portion 21*c* is provided in the first part 21*a*. A projection portion 21*d* is provided in the second part 21*b*.

The first electrode part 5*a* of the second terminal electrode 5 is configured to have the first parts 16*a* to 21*a* of the electrode layers 16 to 21 in a layered manner. The second electrode part 5*b* of the second terminal electrode 5 is configured to have the second parts 16*b* to 21*b* of the electrode layers 16 to 21 in a layered manner. The first projection portion 5*c* of the second terminal electrode 5 is configured to have the projection portions 16*c* to 21*c* of the electrode layers 16 to 21 in a layered manner. The second projection portion 5*d* of the second terminal electrode 5 is configured to have the projection portions 16*d* to 21*d* of the electrode layers 16 to 21 in a layered manner.

In the multilayer coil component 1, as illustrated in FIG. 2, a coil 7 is disposed inside the element assembly 2. The coil axis of the coil 7 extends in the third direction D3. As illustrated in FIG. 2, the coil 7 is configured to have a first conductor 22, a second conductor 23, a third conductor 24, a fourth conductor 25, a fifth conductor 26, and a sixth conductor 27, which are electrically connected to each other. Each of the conductors 22 to 27 has a predetermined thickness in the third direction D3. Each of the conductors 22 to 27 is constituted of a conductive material (for example, Ag or Pd). Each of the conductors 22 to 27 is constituted as a sintered body of a conductive paste including the conductive material. In the present embodiment, each of the conductors 22 to 27 (coil 7) is formed of the same conductive material as the first terminal electrode 4 and the second terminal electrode 5. The conductors 22 to 27, the electrode layers 10 to 15, and the electrode layers 16 to 21 are formed by being baked at the same time. Each of the conductors 22 to 26 is disposed on the dielectric layer 6. The dielectric layer 6 illustrated in FIG. 2 is configured to have dielectric layers in which the conductors 22 to 27 are disposed and dielectric layers (pattern sheets) in which patterns corresponding to the shapes of the conductors 22 to 27 are respectively provided, in an overlapping manner.

One end portion of the coil 7 and the first terminal electrode 4 are electrically connected to each other by a connection portion 27*a*. The other end portion of the coil 7 and the second terminal electrode 5 are electrically connected to each other by a connection portion 22*a*. The connection portion 22*a* is formed integrally with the first conductor 22. The connection portion 27*a* is formed integrally with the sixth conductor 27.

As illustrated in FIG. 3, in the multilayer coil component 1, the element assembly 2 is present between an imaginary line L1 extending in the second direction D2 toward the end surface 2*a* from the end portion of the first projection portion 4*c* at a position farthest from the main surface (mounting surface) 2*d* in the first electrode part 4*a* of the first terminal electrode 4, and the main surface 2*d*. That is, in the multilayer coil component 1, the element assembly 2 is present between the first projection portion 4*c* and the end surface 2*a*. In addition, in the multilayer coil component 1, the element assembly 2 is present between an imaginary line L2 extending in the first direction D1 toward the main surface 2*d* from the end portion of the second projection portion 4*d* at a position farthest from the end surface 2*a* in the second electrode part 4*b* of the first terminal electrode 4, and the end surface 2*a*. That is, in the multilayer coil component 1, the element assembly 2 is present between the first projection portion 5*c* and the end surface 2*b*.

In the multilayer coil component 1, the element assembly 2 is present between an imaginary line L3 extending in the second direction D2 toward the end surface 2*b* from the end portion of the first projection portion 5*c* at a position farthest from the main surface 2*d* in the first electrode part 5*a* of the second terminal electrode 5, and the main surface 2*d*. That is, in the multilayer coil component 1, the element assembly 2 is present between the second projection portion 4*d* and the main surface 2*d*. In addition, in the multilayer coil component 1, the element assembly 2 is present between an imaginary line L4 extending in the first direction D1 toward the main surface 2*d* from the end portion of the second projection portion 5*d* at a position farthest from the end surface 2*b* in the second electrode part 5*b* of the second terminal electrode 5, and the end surface 2*b*. That is, in the multilayer coil component 1, the element assembly 2 is present between the second projection portion 5*d* and the main surface 2*d*.

As described above, in the multilayer coil component 1 according to the present embodiment, the element assembly 2 is present between the imaginary lines L1 and L3 and the main surface 2*d* which is a mounting surface. Accordingly, in the multilayer coil component 1, even if a force acts on the first terminal electrode 4 and the second terminal electrode 5 outward from the end surfaces 2*a* and 2*b* in the second direction D2, since the element assembly 2 is present between the first projection portion 4*c* of the first electrode part 4*a* and the end surface 2*a* and between the first projection portion 5*c* and the first electrode part 5*a*, the element assembly 2 curbs peeling off of the first electrode parts 4*a* and 5*a*. Specifically, since the first projection portion 4*c* and the first projection portion 5*c* are caught by (engage with) the element assembly 2, the element assembly 2 curbs peeling off of the first electrode parts 4*a* and 5*a*. Thus, in the multilayer coil component 1, the first terminal electrode 4 and the second terminal electrode 5 can be prevented from peeling from the element assembly 2.

When the multilayer coil component 1 is mounted on a circuit board or the like, a force applied to the element assembly 2 due to a thermal shock tends to most significantly act on the end portions of the first electrode parts 4*a* and 5*a* at positions away from the main surface 2*d* (mounting surface). Accordingly, in the multilayer coil component 1, the first electrode parts 4*a* and 5*a* are likely to peel from the element assembly 2. Therefore, when the main surface 2*d* of the element assembly 2 is a mounting surface, a configuration in which the element assembly 2 is present between the imaginary lines L1 and L3 and the end surfaces 2*a* and 2*b* is particularly effective to prevent peeling off of the first electrode parts 4*a* and 5*a*.

In addition, in the multilayer coil component 1, according to the foregoing configuration, the first terminal electrode 4 and the second terminal electrode 5 can be prevented from peeling from the element assembly 2. Therefore, in the multilayer coil component 1, there is no need to provide a fixing portion as in the related art. Thus, in the multilayer coil component 1, stray capacitance can be prevented from being generated with respect to the coil 7. Therefore, in the multilayer coil component 1, characteristics can be prevented from deteriorating.

In the multilayer coil component 1 according to the present embodiment, the first terminal electrode 4 and the second terminal electrode 5 have the second electrode parts 4*b* and 5*b*, and the second electrode parts 4*b* and 5*b* are disposed inside the element assembly 2. In the multilayer coil component 1, the element assembly 2 is present between the imaginary lines L2 and L4 extending in the first direction D1 toward the main surface 2*d* from a position farthest from the end surfaces 2*a* and 2*b* in the second direction D2 in the second electrode parts 4*b* and 5*b* positioned inside the element assembly 2, and the end surfaces 2*a* and 2*b*. In this configuration, the element assembly 2 is present between the imaginary lines L2 and L4 and the end surfaces 2*a* and 2*b*. Accordingly, in the multilayer coil component 1, even if a force acts on the first terminal electrode 4 and the second terminal electrode 5 outward from the main surface 2*d* in the first direction D1, since the element assembly 2 is present between the second projection portion 4*d* of the second electrode part 4*b* and the main surface 2*d* and between the second projection portion 5*d* of the second electrode part 5*b* and the main surface 2*d*, the element assembly 2 curbs peeling off of the second electrode parts 4*b* and 5*b*. Thus, in the multilayer coil component 1, the first terminal electrode 4 and the second terminal electrode 5 can be further prevented from peeling from the element assembly 2.

Hereinabove, the embodiments of the present invention have been described. However, the present invention is not necessarily limited to the embodiments described above, and various changes can be made within a range not departing from the gist thereof.

In the foregoing embodiments, an example of an embodiment in which the first projection portion 4*c* is provided in the first electrode part 4*a* of the first terminal electrode 4 and the second projection portion 4*d* is provided in the second electrode part 4*b* has been described. Similarly, an example of an embodiment in which the first projection portion 5*c* is provided in the first electrode part 5*a* of the second terminal electrode 5 and the second projection portion 5*d* is provided, in the second electrode part 5*b* has been described. However, a projection portion need only be provided in at least one of the first electrode parts 4*a* and 5*a* and the second electrode parts 4*b* and 5*b*. When the main surface 2*d* of the element assembly 2 is a mounting surface, it is preferable that the projection portion be provided in the first electrode parts 4*a* and 5*a*.

Figure 7:
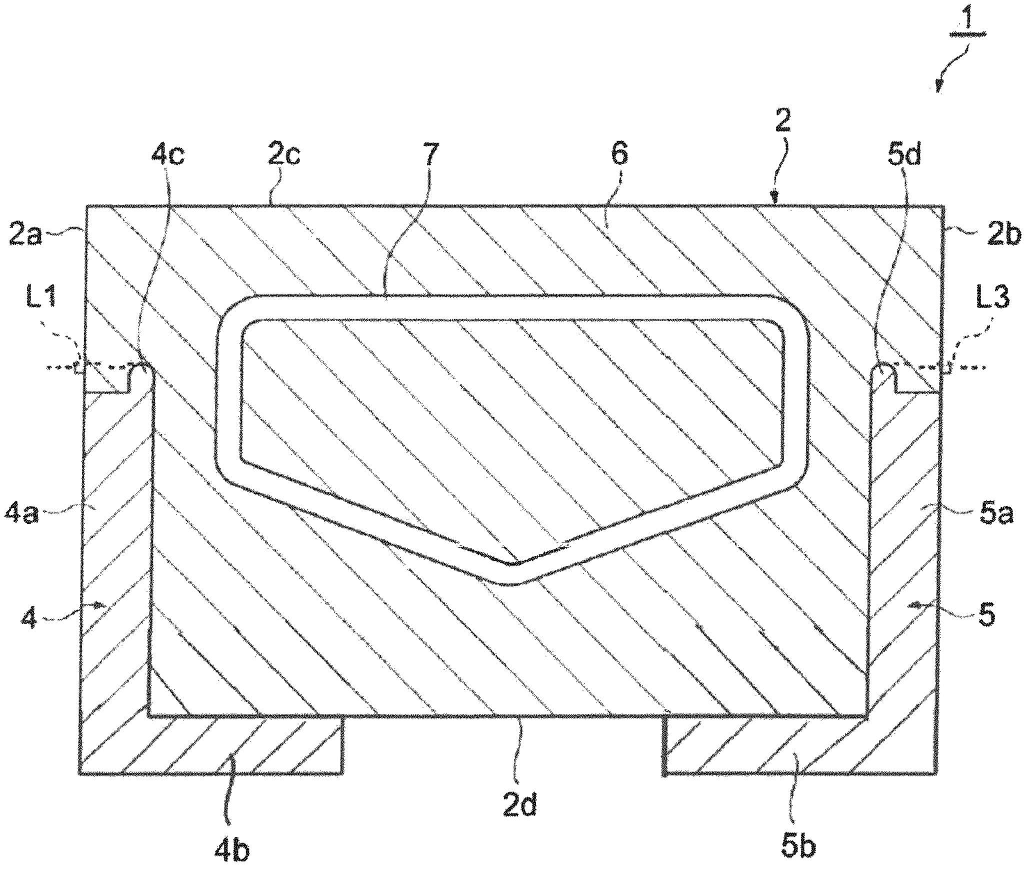
FIG. 7 is a view illustrating a cross-sectional configuration of the multilayer coil component according to another embodiment.

In the foregoing embodiments, an example of an embodiment in which the first terminal electrode 4 is embedded in the element assembly 2 and the front surface of the first terminal electrode 4 is flush with each of the end surface 2*a* and the main surface 2*d* has been described. Similarly, in the second terminal electrode 5 as well, an example of an embodiment in which the second terminal electrode 5 is embedded in the element assembly 2 and the front surface of the second terminal electrode 5 is flush with each of the end surface 2*b* and the main surface 2*d* has been described. However, the shapes of the first terminal electrode 4 and the second terminal electrode 5 are not limited thereto. For example, the second electrode part 4*b* of the first terminal electrode 4 and the second electrode part 5*b* of the second terminal electrode 5 may be disposed on the main surface 2*d*. In this configuration, at least, the first projection portion 4*c* may be provided in the first electrode part of the first terminal electrode 4 and the first projection portion 5*c* may be provided in the first electrode part 5*a* of the second terminal electrode 5. See, for example, FIG. 7.

In the foregoing embodiments, an example of an embodiment in which the coil 7 is disposed inside the element assembly 2 and the coil 7 is configured to have the conductors 22 to 27 has been described. However, the configuration of the coil is not limited thereto.

Figure 4:
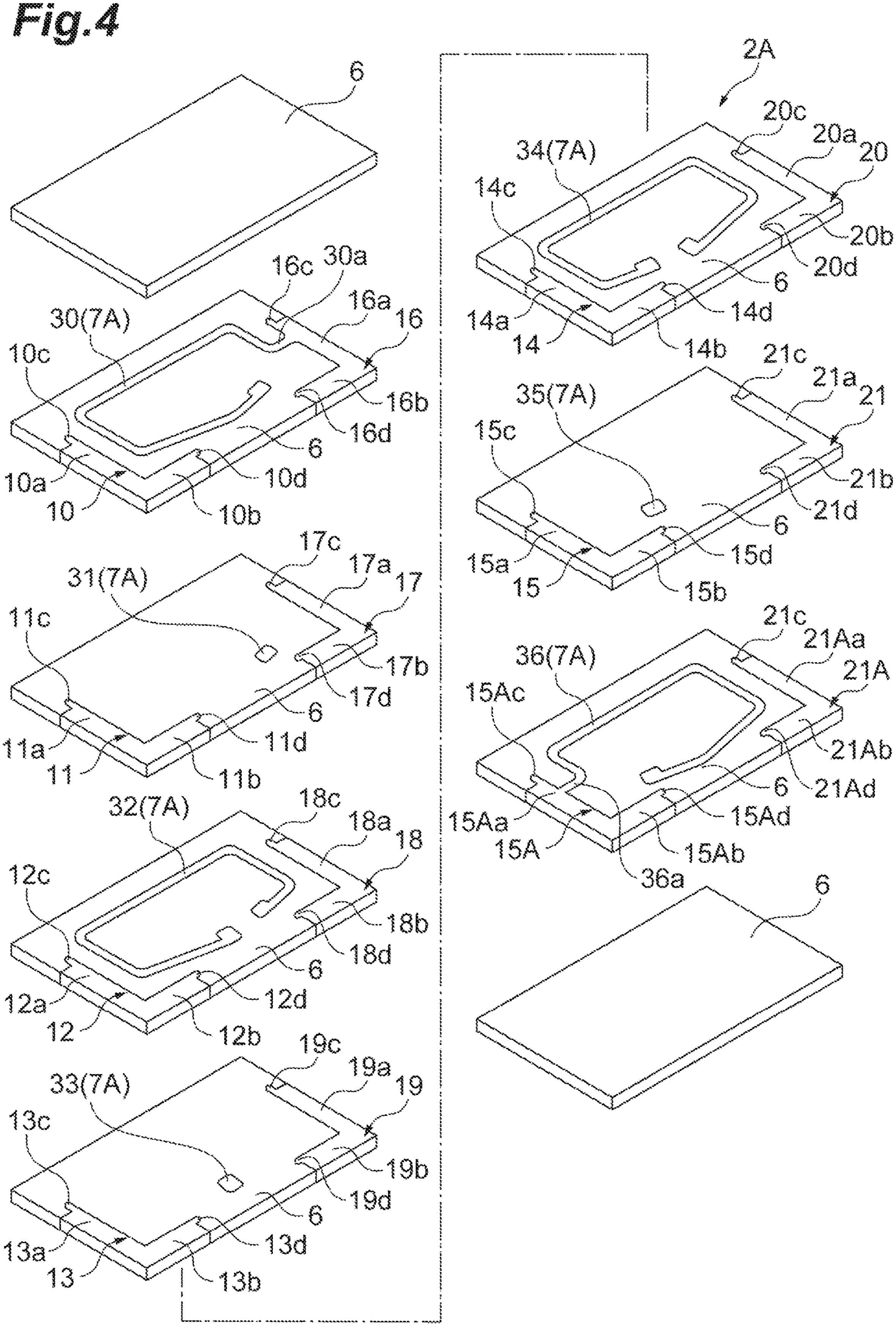
FIG. 4 is an exploded perspective view of an element assembly of a multilayer coil component according to another embodiment.

As illustrated in FIG. 4, for example, a coil 7A disposed inside an element assembly 2A is configured to have a first conductor 30, a second conductor 31, a third conductor 32, a fourth conductor 33, a fifth conductor 34, a sixth conductor 35, and a seventh conductor 36, which are electrically connected to each other. The first terminal electrode 4 illustrated in FIG. 4 is configured to include an electrode layer 15A in addition to the electrode layers 10 to 15. The electrode layer 15A has a first part 15Aa, a second part 15Ab, a first projection portion 15Ac, and a second projection portion 15Ad. The second terminal electrode 5 is configured to include an electrode layer 21A in addition to the electrode layers 16 to 21. The electrode layer 21A has a first part 21Aa, a second part 21Ab, a first projection portion 21Ac, and a second projection portion 21Ad.

One end portion of the coil 7A and the first terminal electrode 4 are electrically connected to each other by a connection portion 36*a*. The other end portion of the coil 7A and the second terminal electrode 5 are electrically connected to each other by a connection portion 30*a*. The connection portion 30*a* is formed integrally with the first conductor 30. The connection portion 36*a* is formed integrally with the seventh conductor 36.

In the foregoing embodiments, as a configuration in which the element assembly 2 is present between the imaginary lines L1 and L3 and the main surface 2*d*, an example of an embodiment in which the first projection portion 4*c* is provided in the first electrode part 4*a* of the first terminal electrode 4 and the first projection portion 5*c* is provided in the first electrode part 5*a* of the second terminal electrode 5 has been described. In addition, as a configuration in which the element assembly 2 is present between the imaginary lines L2 and L4 and the end surfaces 2*a* and 2*b*, an example of an embodiment in which the second projection portion 4*d* is provided in the second electrode part 4*b* of the first terminal electrode 4 and the second projection portion 5*d* is provided in the second electrode part 5*b* of the second terminal electrode 5 has been described. However, the configuration in which the element assembly 2 is present between the imaginary lines L1 and L3 and the main surface 2*d* and between the imaginary lines L2 and L4 and the end surfaces 2*a* and 2*b* is not limited thereto.

Figure 5A:
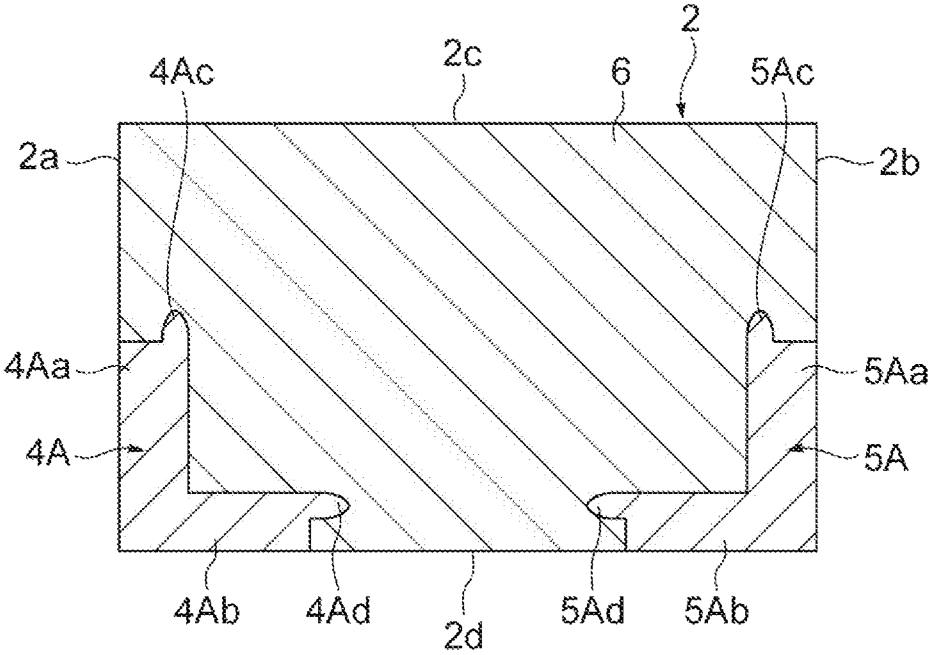
FIG. 5A is a view illustrating a cross-sectional configuration of a multilayer coil component according to another embodiment.

As illustrated in FIG. 5A, in a first terminal electrode 4A, a first projection portion 4Ac provided in a first electrode part 4Aa and a second projection portion 4Ad provided in a second electrode part 4Ab may exhibit a shape tapered toward the distal end. Similarly, in a second terminal electrode 5A, a first projection portion 5Ac provided in a first electrode part 5Aa and a second projection portion 5Ad provided in a second electrode part 5Ab may exhibit a shape tapered toward the distal end.

Figure 5B:
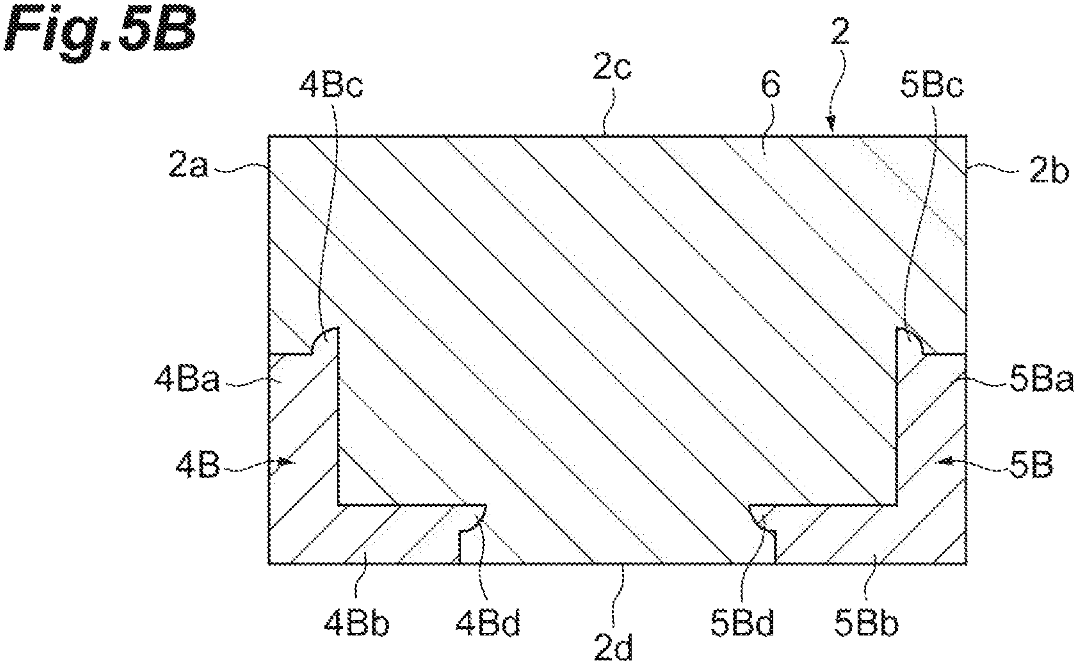
FIG. 5B is a view illustrating a cross-sectional configuration of a multilayer coil component according to another embodiment.

As illustrated in FIG. 5B, in a first terminal electrode 4B, a first projection portion 4Bc provided in a first electrode part 4Ba and a second projection portion 4Bd provided in a second electrode part 4Bb may exhibit a fan shape. Similarly, in a second terminal electrode 5B, a first projection portion 5Bc provided in a first electrode part 5Ba and a second projection portion 5Bd provided in a second electrode part 5Bb may exhibit a fan shape.

Figure 6A:
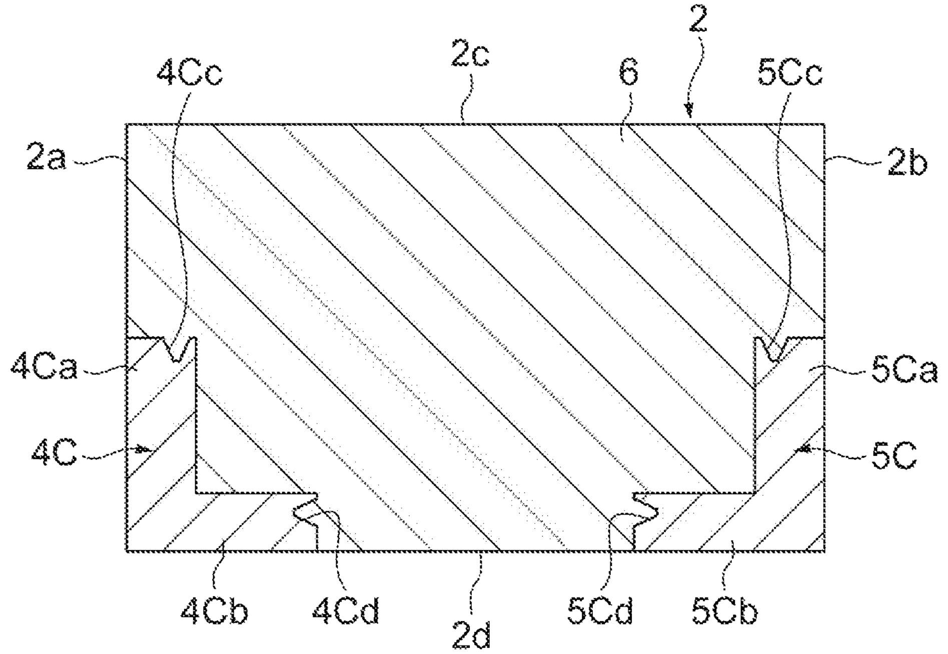
FIG. 6A is a view illustrating a cross-sectional configuration of a multilayer coil component according to another embodiment.

As illustrated in FIG. 6A, in a first terminal electrode 4C, a recess portion 4Cc may be provided in a first electrode part 4Ca and a recess portion 4Cd may be provided in a second electrode part 4Cb. Similarly, in a second terminal electrode 5C, a recess portion 5Cc may be provided in a first electrode part 5Ca and a recess portion 5Cd may be provided in a second electrode part 5Cb.

Figure 6B:
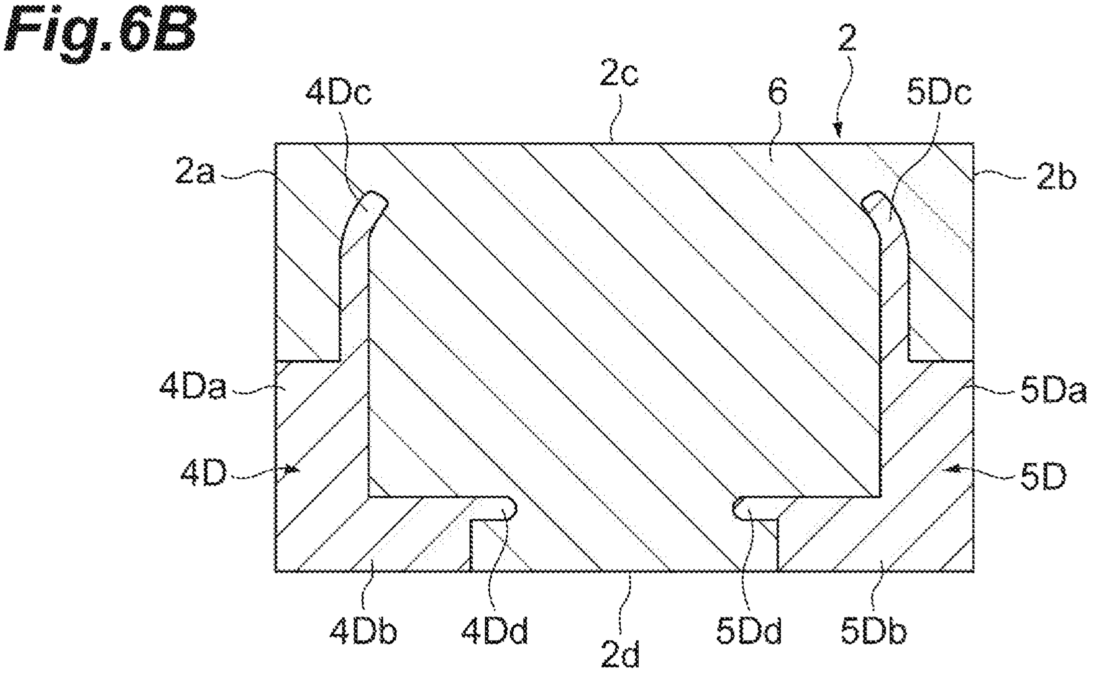
FIG. 6B is a view illustrating a cross-sectional configuration of a multilayer coil component according to another embodiment.

As illustrated in FIG. 6B, in a first terminal electrode 4D, a first projection portion 4Dc provided in a first electrode part 4Da may extend toward the main surface 2*c* side. Similarly, in a second terminal electrode 5D, a first projection portion 5Dc provided in a first electrode part 5Da may extend toward the main surface 2*c* side. A second projection portion 4Dd provided in a second electrode part 4Db of the first terminal electrode 4D and a second projection portion. 5Dd provided in a second electrode part 5Db of the second terminal electrode 5D may extend to the end surfaces 2*a* and 2*b* side.

What is claimed is:

1. A multilayer coil component comprising:

an element assembly that has a first surface and a second surface extending in a direction orthogonal to the first surface;

a coil that is disposed inside the element assembly; and a terminal electrode that has a first electrode part extending in the direction orthogonal to the first surface along the second surface, wherein at least a portion of the first electrode part of the terminal electrode is disposed inside the element assembly, the element assembly is present between an imaginary line extending in a direction parallel to the first surface toward the second surface from a position farthest from the first surface in the direction orthogonal to the first surface in the first electrode part positioned inside the element assembly, and the first surface, the terminal electrode is formed by stacking a plurality of electrode layers in a stacking direction, a first electrode layer and a second electrode layer, which is another one of the plurality of electrode layers next and adjacent to the first electrode layer in the stacking direction, have an identical shape, the first electrode layer has a first protrusion that is inside the element assembly, is distanced from the second surface and protrudes from the first electrode layer in the direction orthogonal to the first surface along the second surface away from the first surface, the first protrusion having a first curved tip distal from the first surface, the second electrode layer next and adjacent to the first electrode layer has a second protrusion that is inside the element assembly, is distanced from the second surface and protrudes from the second electrode layer in the direction orthogonal to the first surface along the second surface away from the first surface, the second protrusion having a second curved tip distal from the first surface, the second protrusion is next and adjacent to the first protrusion in the stacking direction, the first protrusion and the second protrusion have an identical shape, the element assembly is present between a first imaginary line extending in a direction parallel to the first surface toward the second surface from a position farthest from the first surface in the direction orthogonal to the first surface in the first protrusion, and the first surface, and the element assembly is present between a second imaginary line extending in a direction parallel to the first surface toward the second surface from a position farthest from the first surface in the direction orthogonal to the first surface in the second protrusion, and the first surface.

2. The multilayer coil component according to claim 1, wherein the terminal electrode has a second electrode part extending in a direction orthogonal to the second surface along the first surface.

3. The multilayer coil component according to claim 2, wherein at least a portion of the second electrode part of the terminal electrode is disposed inside the element assembly, and wherein the element assembly is present between an imaginary line extending in a direction parallel to the second surface toward the first surface from a position farthest from the second surface in a direction orthogonal to the second surface in the second electrode part positioned inside the element assembly, and the second surface.

4. The multilayer coil component according to claim 1, wherein the first surface of the element assembly is a mounting surface.

5. The multilayer coil component according to claim 1, wherein the first surface of the element assembly is a mounting surface, and wherein the terminal electrode has a second electrode part extending in a direction orthogonal to the second surface along the first surface and being disposed on the first surface.

6. The multilayer coil component according to claim 1, wherein the coil is electrically connected to the first electrode part only by direct connection with the first electrode layer.

7. The multilayer coil component according to claim 1, wherein the position farthest from the first surface in the direction orthogonal to the first surface in the first protrusion and the position farthest from the first surface in the direction orthogonal to the first surface in the second protrusion have a same distance from the first surface in the direction orthogonal to the first surface.

8. The multilayer coil component according to claim 1, wherein the coil is connected to the first electrode part only at the first electrode layer of the plurality of electrode layers.

* * * * *